(12) United States Patent
Simpson et al.

(10) Patent No.: US 8,887,642 B2
(45) Date of Patent: Nov. 18, 2014

(54) CART MOVEMENT TRACK

(75) Inventors: Bradley T. Simpson, Rodney (CA);
Christopher M. Briggs, Cathcart (CA);
Robert B. Franklin, Tillsonburg (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 185 days.

(21) Appl. No.: 13/565,058

(22) Filed: Aug. 2, 2012

(65) Prior Publication Data

US 2014/0033940 A1 Feb. 6, 2014

(51) Int. Cl.
*B61B 13/04* (2006.01)

(52) U.S. Cl.
USPC .............................................. 104/96; 104/119

(58) Field of Classification Search
CPC ...... B61B 13/04; B61B 13/127; B61B 10/00; B61B 10/04; B62D 65/18
USPC ............. 104/172.2, 172.3, 172.4, 172.5, 165, 104/243, 249, 245, 246, 119; 414/646, 648, 414/658
See application file for complete search history.

(56) References Cited

U.S. PATENT DOCUMENTS

| | | | | |
|---|---|---|---|---|
| 2,794,296 | A * | 6/1957 | Fields | 446/444 |
| 3,811,383 | A * | 5/1974 | Butzow | 104/130.01 |
| 4,502,628 | A * | 3/1985 | Sarantitis | 238/122 |
| 4,702,174 | A * | 10/1987 | Tredwell et al. | 104/172.2 |
| 5,195,630 | A * | 3/1993 | Donovan et al. | 198/465.3 |
| 5,393,180 | A * | 2/1995 | Van Den Aarsen | 414/409 |
| 5,549,050 | A * | 8/1996 | Rhodes | 104/172.3 |
| 6,155,766 | A * | 12/2000 | Ostwald et al. | 414/279 |
| 7,997,208 | B2 * | 8/2011 | Tabler | 104/96 |
| 8,584,594 | B2 * | 11/2013 | Dehne et al. | 104/165 |
| 2005/0061194 | A1 * | 3/2005 | Tada et al. | 104/165 |
| 2006/0054049 | A1 * | 3/2006 | Cho | 104/172.3 |

* cited by examiner

*Primary Examiner* — Jason C Smith
(74) *Attorney, Agent, or Firm* — Christopher G. Darrow; Young Basile Hanlon & MacFarlane, P.C.

(57) ABSTRACT

A cart is movably engaged with a flow control track by a pair of different height cam followers. An end track segment between parallel side leg track segments of the track contains inner and outer end channels. An intermediate wall in the end track segment forms the outer and inner end channels and cooperates with the height of the cam followers to direct one cam follower on each cart into one of the inner and outer end tracks and the other cam follower on the cart into the other of the inner and outer end channels to smoothly control the movement of the cart around the end segment between the ends of the first and second side leg track segments.

18 Claims, 10 Drawing Sheets

CART MOVEMENT TRACK

BACKGROUND

The present invention relates, in general, to non-motorized carts which are moved around a track.

In automotive assembly plants, it is known to use carts for accumulating automotive parts or components used in the assembly of an automotive vehicle on supply lines spaced from the main assembly line. Typically, a wheeled, non-motorized cart has cam followers which slide along a track mounted in the assembly plant floor. The cart is pushed by an operator along the track between various parts containers or bins located around the track. The operator transfers the required number of components from each bin into the cart in order to supply the assembly line with the proper components for each vehicle being assembled.

A prior art cart movement control track used in a vehicle assembly plant is shown in FIGS. 11 and 12. As shown in FIG. 11, the cart track was placed immediately in front of the parts bins. This required the operator to push the cart from the inside of the track, and to step over the track to reach the parts bins located outside of the track. This creates a trip hazard for the cart operator as well as an ergonomic issue for the operator as the operator would frequently step on the edges of the raised track.

Further, the ends of the continuous track loop form a single large radius arc. This requires a considerable amount of valuable floor space within the assembly plant to accommodate the track since the space inside of the track could not be used for other purposes.

It would desirable to provide cart movement control track which addresses these problems.

SUMMARY

A cart directional flow control apparatus includes a track and a movable cart with first and second cam followers along one edge slidable along the track with the first cam follower located forward of the second cam follower in the direction of travel of the cart along the track. An elevation of the bottom surface of the first cam follower above the track floor is higher than the elevation of a bottom surface of a second cam follower. The track is defined by a first and second substantially parallel side leg track segments respectively defining first and second channels movably receiving the first and second cam followers, respectively, and a first end track segment continuously joining one end of each of the first and second side leg segments with first and second inner and outer end channels formed in the first end track segment separately respectively receiving the second and first cam followers to guide the cart around the first end track segment between the first and second side leg track segments.

A realignment track segment couples one end of the first end track segment and one end of the second side leg track segment to direct the first and second cam followers of the cart in the respective first and second end tracks in the first end track segment into the second side leg track segment.

An intermediate wall separates the first end track segment into first and second inner and outer end tracks. The elevation of the bottom surfaces of the first and second cam followers cooperates with the height of the intermediate wall in the first end track segment to direct the first cam follower into the second outer end track and to direct the second cam follower into the first inner end track of the first end track segment.

The apparatus of an inner end track in the first end segment forms a continuation of the first and second side leg track segments for movement of the second cam follower on the cart from the first side leg track segment, through the first end track segment and into the second side leg track segment.

The track has a first turn segment contiguous with the first side leg track segment, and a second turn segment contiguous with the second side leg track segment.

Another end segment continuously joins opposed ends of first and second side leg track segments to form the track into continuous loop.

In one aspect a first end of the intermediate wall cooperates with the first and second cam followers to direct the first cam follower to the second outer end track and to direct the second cam follower into the first inner end segment.

An opening is formed between a second end of the intermediate wall and the second side leg track segment. The opening is opposed to a ramp wall directing the first cam follower from the outer end track segment into the second side leg track segment.

A notch is formed at one end of the intermediate wall. The notch has a height less than a height of a bottom surface of the first cam follower allowing the first cam follower to pass over the notch into the second outer end track.

The first and second inner and outer end segment tracks are disposed substantially 90° relative to this longitudinal axes of the first and second side leg track segments.

In one aspect, a bottom surface of a first cam follower is at a first elevation, a bottom surface of the second cam follower is at a second elevation; and the first elevation is less than the second elevation. The height of the first end of the intermediate wall is less than the first elevation and greater than the second elevation.

The intermediate wall has a first height over a substantial entire length and a notch formed at the first end of the intermediate wall defining the height of the first end of the intermediate wall as less than the first height of the substantial entire length of the intermediate wall.

A cart directional flow control apparatus has a track and a movable cart with first and second cam followers along one edge that is slidable along the track with the first cam follower disposed forward of the second cam follower in the direction of travel of the cart along the track. An elevation of the bottom surface of the first cam follower is higher than the elevation of a bottom surface of a second cam follower. The track is defined by a first and second substantially parallel leg segments with respective first and second channels movably receiving the first and second cam followers, respectively. At least one end segment continuously joins one end of the first and second leg segments. An intermediate wall in the end segment defines substantially parallel inner and outer end segment channels. The first end of the intermediate wall is disposed in intersecting communication with the first channel in the first track. The first end of the intermediate wall cooperates with the first and second cam followers to direct the first and second cam followers respectively through the outer and inner end segment channels at an angle to the axial extent of the intermediate wall.

The end segment includes a turn portion communicating with one end of the second track channel and coaxially disposing the inner end segment channel with the second track channel. A ramp wall is opposed to a second end portion of the intermediate wall and forms a continuous extension of an outer wall of the end track segment and the second track to direct the first cam follower from the outer end segment channel into the second track channel ahead of the second cam follower.

A part accumulation storage cart is movable along a track between a plurality of part storage locations to allow accumulation of selected parts from the plurality of parts storage locations into the cart. The track has first and second substantially parallel side leg segments and first and second opposed end segments connecting opposed ends of the first and second side leg segments. A cart carrying the parts container has first and second cam followers movably engaging the track to control movement of the cart along the track between the plurality of parts storage locations.

A part accumulation storage cart movement control apparatus with a continuous loop track formed of first and second substantially parallel side leg track segments and opposed first and second end track segments respectively interconnected with opposed ends of the first and second side track segment. At least one cart is movably coupled to the track for movement along the track. The cart is disposed exteriorly of the track and the first and second end tracks end track segments. At least one parts container is disposed exteriorly of the path of movement of the at least one cart along the track.

BRIEF DESCRIPTION OF THE DRAWING

The various features, advantages and other uses of the present cart movement control become more apparent by referring to the following detailed description and drawing in which.

DETAILED DESCRIPTION

Figure 1:
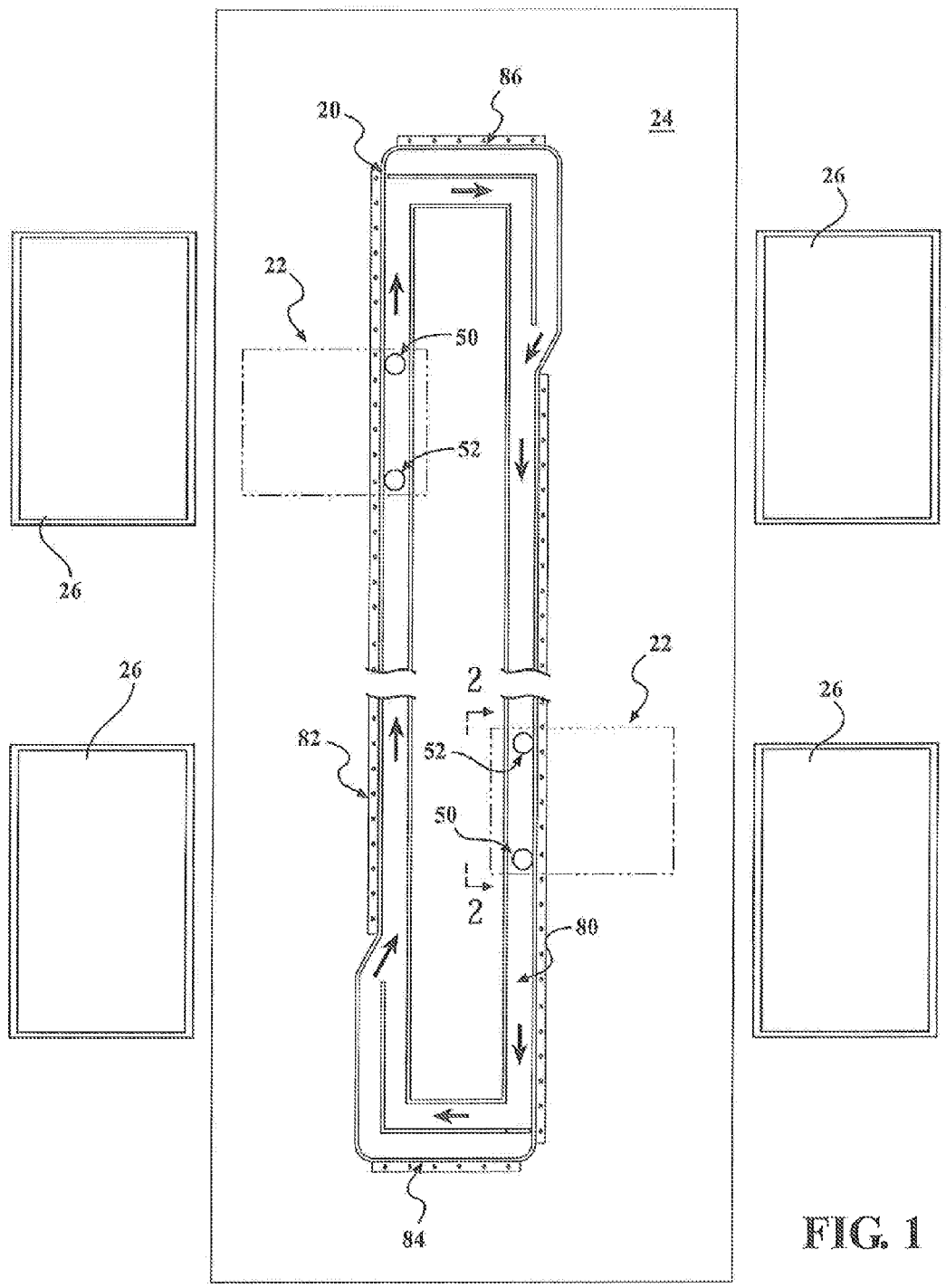
FIG. 1 is a plan view of a pictorial representation of a cart movement control track mounted in an assembly plant inside of component parts storage bins.

Referring now to the drawings, and to FIGS. 1-10 in particular, there is depicted a non-motorized cart movement or flow control track 20 which controls the movement of one or a plurality of non-motorized push carts 22 around the track 20 which may in the form of a closed loop, by example only.

The track 24 is mounted in or on a facility floor 24, such as the floor of an automotive vehicle assembly plant.

In the particular track example shown in FIG. 1, the track 20 forms a closed loop inside of a plurality of large vehicle parts or component bins 26 which are arranged along the sides and possibly one or both ends of the track 20.

In use, an operator pushes one cart 22 around the entire closed loop of the track 20 stopping at the appropriate part bins 26 to pick up the required number of vehicle parts or components required for a particular vehicle model and then placing the parts or components in a container mounted on the cart 22.

Figure 2:
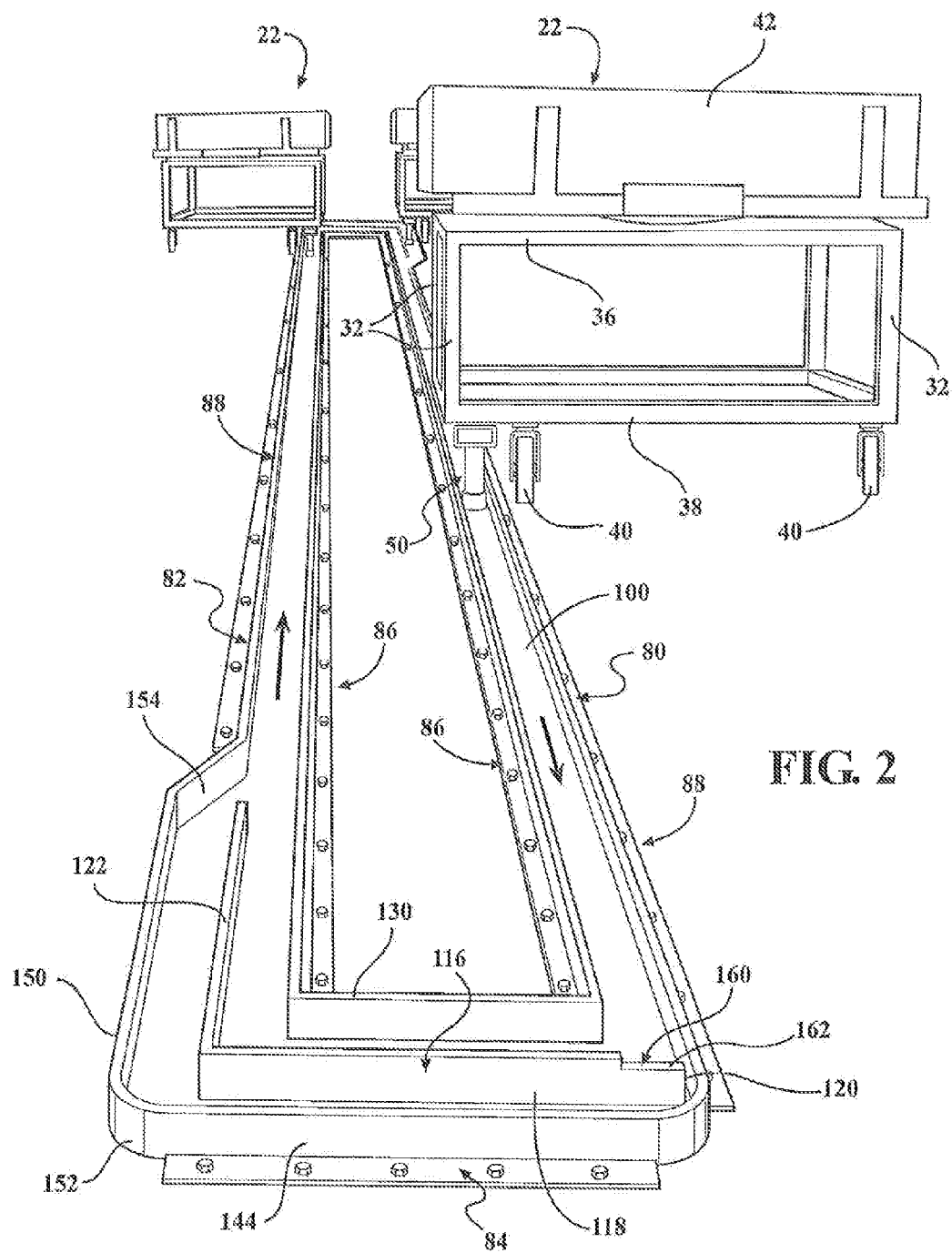
FIG. 2 is a perspective view from one end of the track shown in FIG. 1.
Figure 3:
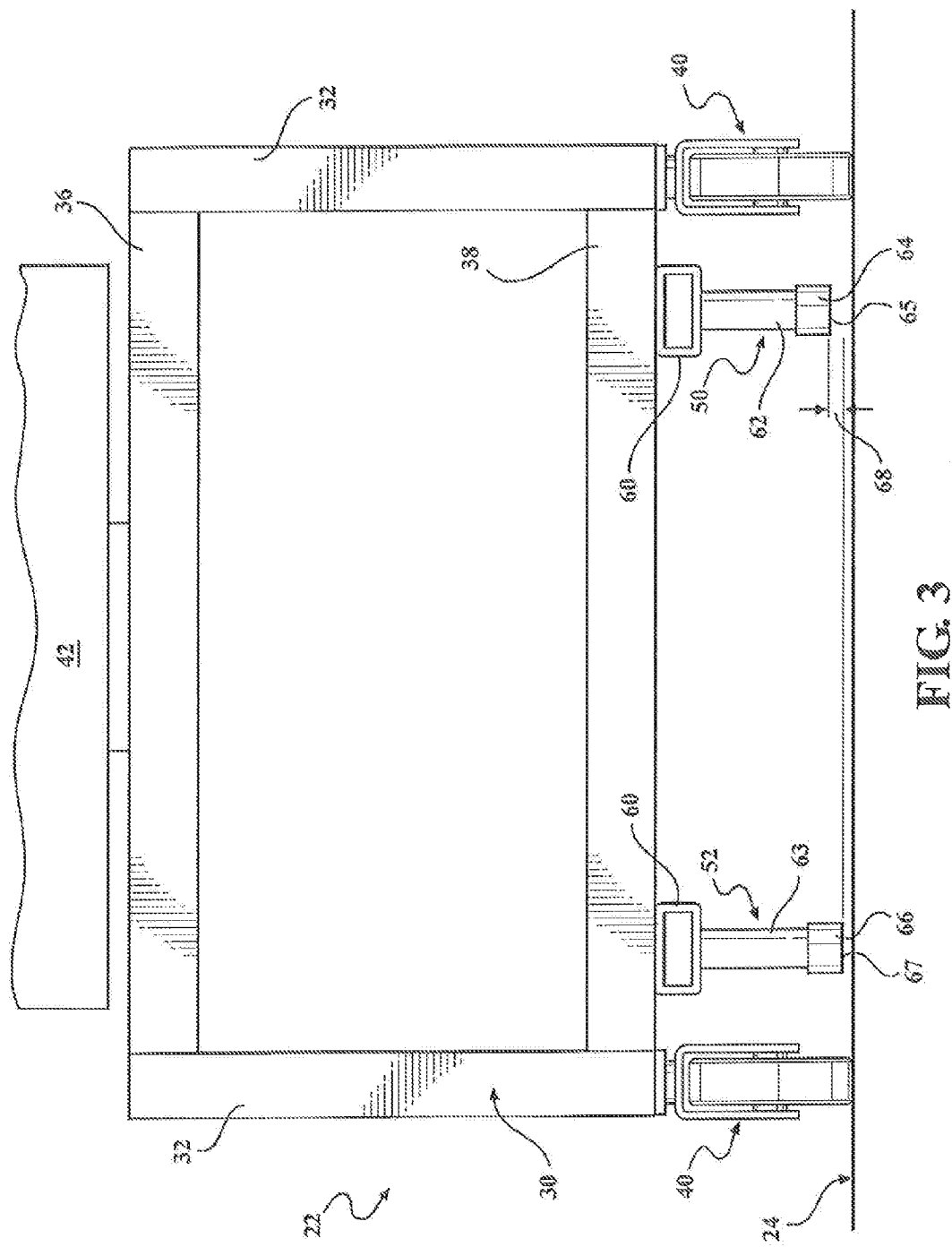
FIG. 3 is a front end view of one of the carts moveable along the track and showing the pair of cam followers on the cart.

As shown in FIG. 3 by way of example only, each cart 22 may have an exterior frame 30 formed of a vertically extending corner posts 32 which are connected at opposite ends by upper and lower sets of horizontally extending rails 36 and 38. The corner posts 32 and the upper and lower rails 36 and 38 are interconnected by fasteners, welding, etc., into the rigid frame structure 30. A plurality of wheels 40, each typically in the form of a swivel wheel assembly, are mounted, as shown in FIGS. 2 and 3, to the horizontally extending lower rails 38, typically a short distance inward from the corner posts 36.

A parts receptacle or container 42 is mounted to the upper rails 36. By way of example, the parts container 42 may be rotatable with respect to the upper rails 36 of the cart 30 to facilitate loading and unloading of vehicle parts to and from the container 42 as the cart 22 traverses the entire length of the track 20.

A pair of cart movement control members 50 and 52 are fixed to one of the lower horizontal frame rails 38. Each cart movement control member 50 and 52 includes an attachment member 60 secured to the lower frame rail 38 by fasteners, welding, etc. A post 62 is fixed to the attachment member 60 and projects downwardly from the attachment member 60 and the lower frame rail 38.

A cam follower 64 is fixed or rotatably mounted on one end of the post 62 of the first cart movement control member 50. A similar cam follower 66 is fixed to one end of the post 63 of the second cart movement control member 52.

As shown in FIG. 3, a the bottom surface 65 of the first cam follower 64 is spaced at a higher elevation above the plant floor or a track 24 than a bottom surface 67 of the cam follower 66. This elevational or height difference, denoted by reference number 68 in FIG. 3, cooperates with the track configuration to smoothly control movement or flow of the cart 22 around the track 20.

The difference in elevational height of the bottom surfaces 65 and 67 of the cam followers 64 and 66, respectively can be provided in a number of different ways, including different length posts 62 and 63, different height cam followers 64 and 66 and/or different height attachment members 60.

Figure 4:
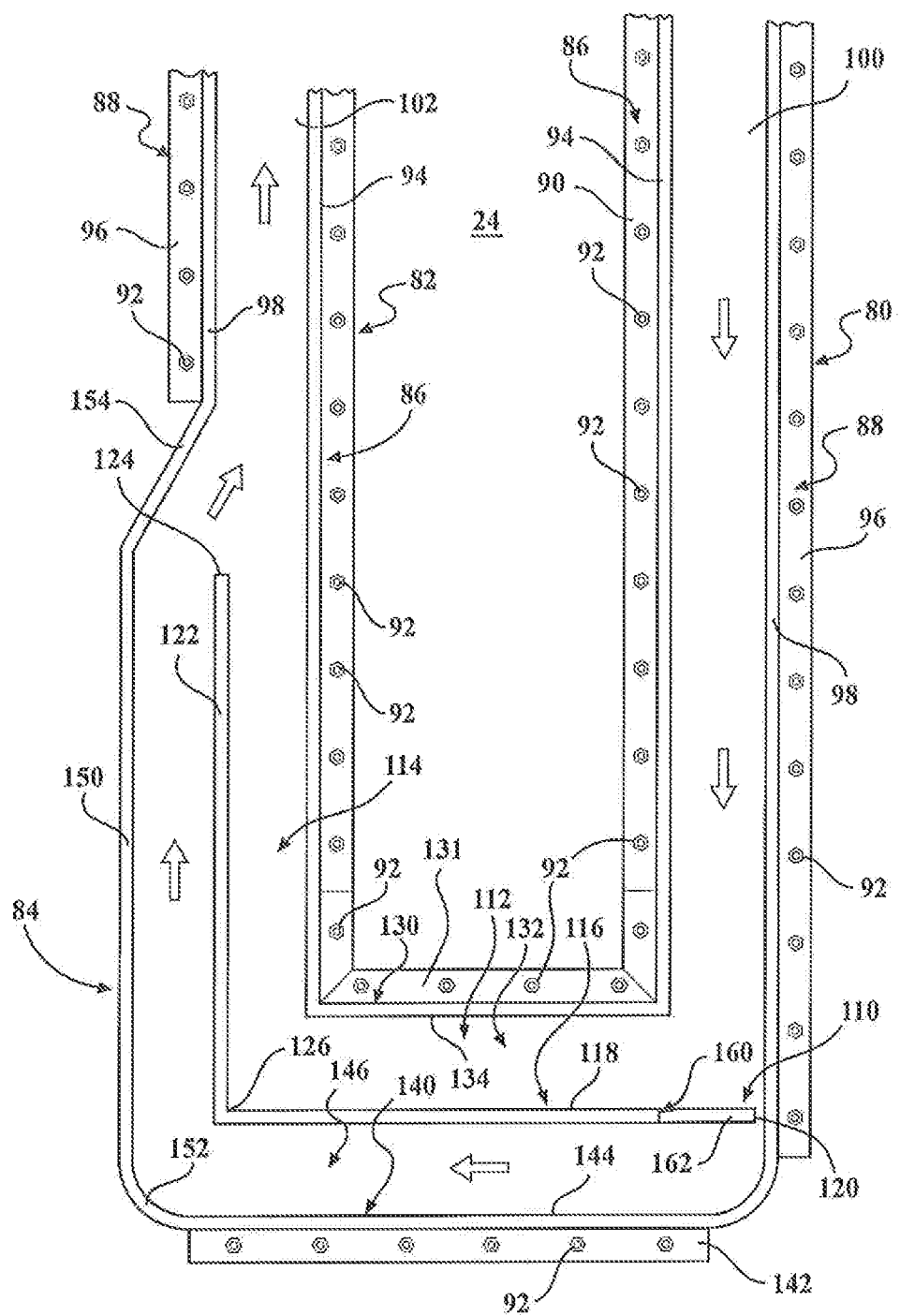
FIG. 4 is an enlarged, plan view of one end of the flow track.

Referring now to FIGS. 1, 2 and 4, the track 20 is, by example only, in the form of a closed loop having first and second opposed, substantially parallel side track segments 80 and 82 which are joined at opposite ends by a first end segment 84 and a substantially identical, opposed second end segment 86.

Each side track segment 80 and 82 is substantially identically constructed. Although the construction of the side track segments 80 and 82 may take many different forms, by way of example only, the first and second side track segments 80 and 82 are each formed of a pair of elongated angled irons, such as inner angle iron 86 and outer angle iron 88. Each angle iron 86 and 88 is formed with a horizontal leg 90 which is fixedly attached to the facility or plant floor 24 by any suitable means, such as through the use of fasteners 92 which are mounted through apertures in the angle iron members 86 and 88 directly into the facility floor 24.

Each angle iron member 86 and 88 also have a second substantially vertically extending leg or wall. Thus, inner angle iron member 86 has a vertically extending leg or wall 94. The outer angle member 88 has a horizontal leg 96 and a second vertically extending leg or wall 98. The horizontal legs 96 of the outer angle irons 88 are similarly fixed to the facility floor 24, such as through the use of bolts 92.

As shown in FIGS. 1, 2 and 4, the vertical legs 94 and 96 of the inner and outer angle irons 86 and 88, respectively form an elongated channel 100 in the first side track segment 80 and a second channel 102 in the opposed second side track segment 82. Each channel 100 and 102 is thus formed between the spaced, generally parallel vertically extending legs 94 and 98 of the angle irons 86 and 88 as well the underlying portion of the facility floor 26.

It will be understood that the side track segments 80 and 82 could also have a different form, such as a U-shaped member which is fixed to the facility floor 24 by welding, suitable fasteners which can extend through a central lower end of the U-shaped member in a flush mount, etc.

Each channel 100 and 102 in the side track segments 80 and 82 has a width slightly larger than the diameter of the cam followers 64 and 66 on the first and second cart movement control members 50 and 52.

It will also be noted, as shown in FIGS. 1 and 2, for example, that the first cam follower 64 will act as a forward cam follower and the second cam follower 66 will act as a rear cam follower viewed in the direction of movement of the cart 22 in a clockwise manner about the track 20.

The first and second end segments 84 and 86 of the tracks 20 are substantially identically formed. It will be understood that the following description of the first track segment 84 will apply equally to the construction of the opposed second track end segment 86. Further, it will be understood that the following description of the construction of the first and second end track segments 84 and 86 is with respect to a clockwise path of movement, as viewed in a plan representation of the track 20 in FIGS. 1, 2 and 4, of the cart or carts 22 around the entire loop of the track 20.

As shown in detail in FIG. 4, the first end segment 84 includes a first turn segment 110, an intermediate linear end section 112 and a second turn segment 114. Due to the compressed width of the track 20, the first and second turn segments 110 and 114 form substantially 90° angles with respect to a longitudinal axis of the first and second channels 100 and 102 in the first and second side tracks 80 and 82.

The first end segment 84 includes an intermediate wall 116 having a first linear portion 118 extending from a first end 120 adjacent an outer end portion of the first side track 80 and a second linear portion 122 terminating in a second end 124. The first and second linear portions 118 and 120 of the intermediate wall 116 are angularly disposed at a substantial 90° angle forming a corner 126.

The first end segment 84 includes an inner wall segment 130 which is disposed between and connected to the ends of the inner leg members 86 of the first and second side tracks 80 and 82. The inner wall segment 130 may also be formed of angle iron with a bottom horizontal portion 131 affixed to the floor 24 by bolts 92 and a vertically extending leg or wall 134.

As shown in FIG. 4, the inner leg or wall 134 forms a continuous extension of the vertical walls 94 of the inner side track angle irons 86.

The first linear portion 118 of the intermediate wall 116 is spaced from the outer wall 140 by a distance substantially equal to the width of the first and second channels 100 and 102. As seen in FIG. 4, the inner wall 134 and the first linear portion 118 of the intermediate wall 116 form an inner channel 132.

Similarly, the first end portion 84 includes an outer wall 140, also formed, by example an angle iron having a lower horizontal leg 142 fixed to the floor 24 by bolts 92 and an inner disposed, vertically extending wall 144. The wall 144 forms an outer wall for the first end segment 84. The outer wall 144 is spaced from the first linear portion 118 of the intermediate wall 116 to form a second channel 146.

The second channel 146 continues through a side end portion 150 which forms a 90° with the outer wall 144. In this manner, the outer channel 146 makes a 90° turn between the corners 126 and 152.

The side end section 150 transitions into an angularly disposed ramp or realignment wall 154 which extends between the side end segment 150 and one end of the vertical wall 98 of the outer side track 88.

As clearly shown in FIG. 4, the second end 124 of the intermediate wall 116 is spaced from the ramp or realignment wall 154 by a distance substantially equal to the width of the inner and outer channels 132 and 146 of the first end segment 84.

It should also be noted that although the first end 120 of the first linear portion 118 of the intermediate wall 116 is shown as extending into substantial proximity with the vertical leg or wall 98 of the outer side track 80, it may be terminated short of the outer leg 98 at a position generally axially in line with the vertical wall 94 of the inner track 86.

Alternately, and as shown in FIG. 4, the first linear portion 118 of the intermediate wall 116 is notched, as shown by reference number 160, at a position generally axially in line with the inner vertical leg 94 of the inner track member 86. The height of the top surface or edge 162 of the notch 160 is selected so as to be less than the elevation or height of the bottom edge 65 of the first cam follower 64, but higher than the elevational height of the bottom edge 67 of the second cam follower 66.

Referring now to FIGS. 5-10, in operation, each cart 22 will be pushed by operation in a clockwise direction around the continuous loop of the track 20 from a start position adjacent the second end segment 86, along the first side leg 80, through the first end segment 84, along the second side leg 82 and then through the second end segment 86 back to the start of the first side leg 80.

As the cart 22 traverses along the length of the first side leg 80, as shown in FIG. 1, the first or front position cam follower 50 will be leading the second or rear disposed cam follower 52.

Figure 5:
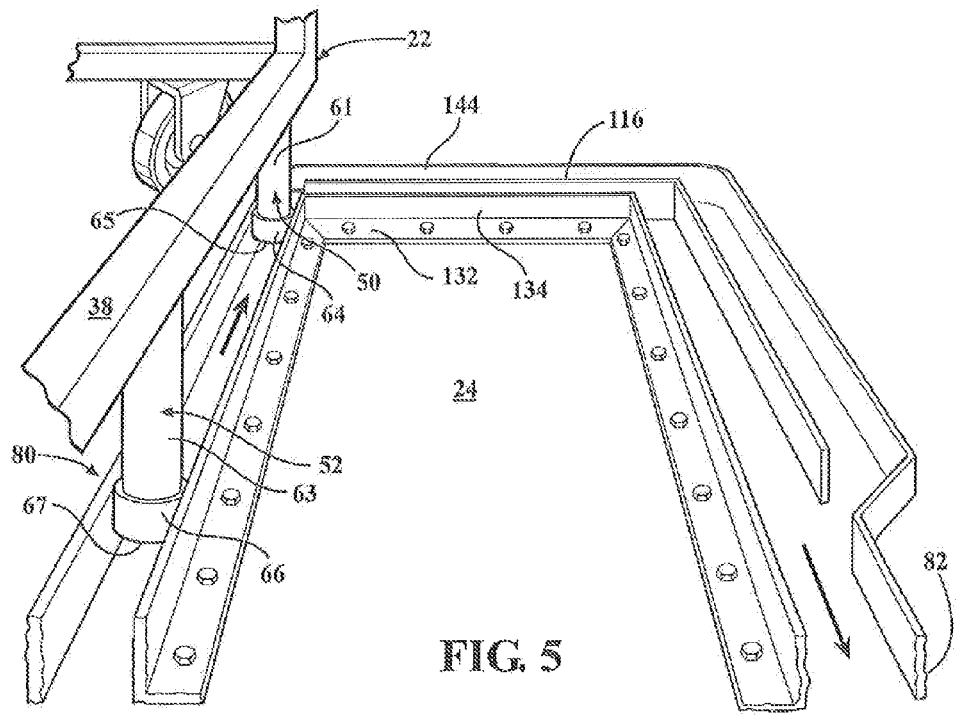
FIGS. 5-10 are perspective views showing the sequence of movement of the cam followers of the cart around one end turn segment of the flow control track.
Figure 6:
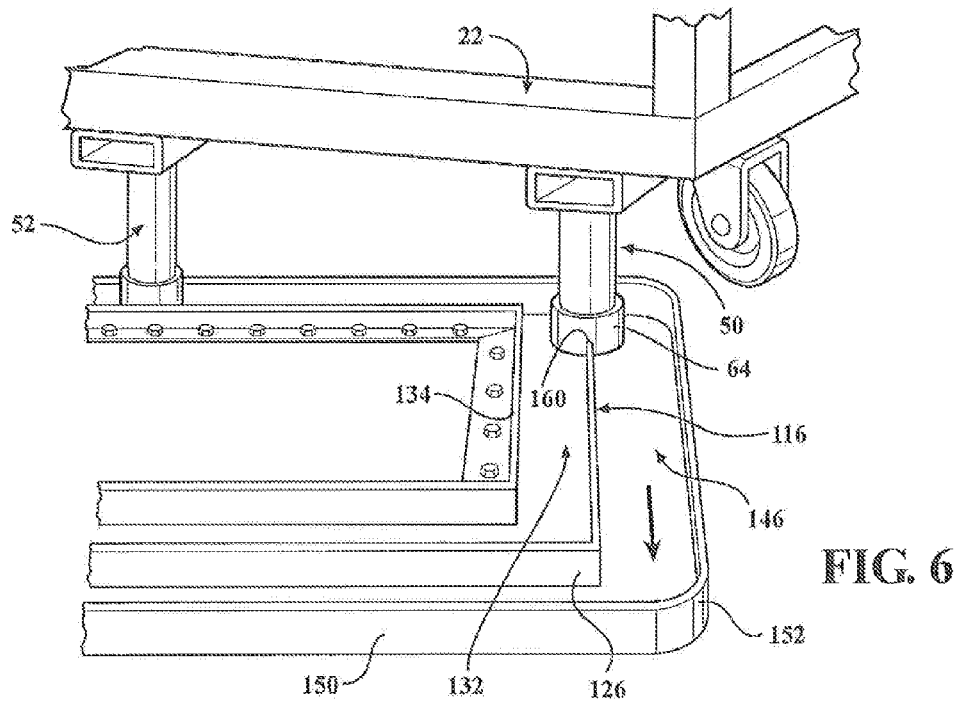

As shown in FIG. 5, the first or front cam follower 50 will reach the end of the first channel 100 in the first side leg 80. Since the height of the top edge 162 of the notch 160 at the end of the first end 120 of the intermediate wall 116 in the first end segment 84 is less or lower than the height of the bottom edge 65 of the first cam follower 64 with respect to the facility floor 24, the first cam follower 64 will pass over the top edge 162 of the notch 160 in the intermediate wall 116 until it strikes an end portion of the outer wall 146. Since the first cam follower 64 is rotatable, the moving force applied by the operator to the cart 22 will cause the forward edge in the first or front cam follower 64 to move through the first turn segment 110 of the first end segment 84 of the track 20 in the direction of the arrow along the outer end channel 146 toward the second turn segment 114 of the first end segment 84, as shown in FIG. 6.

Figure 7:
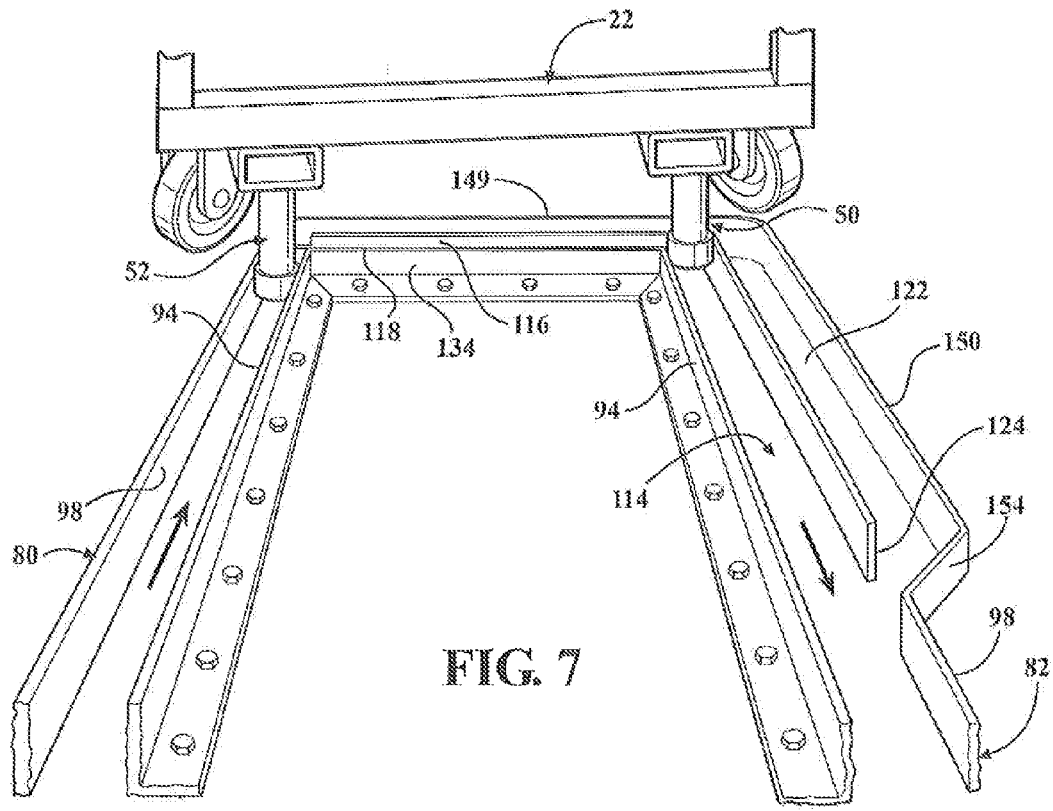

As the first or front located end follower 64 approaches the corner 152 in the outer end channel 146, the rear disposed or second cam follower 66 will be positioned adjacent to the end of the side track 80 and at the inlet or beginning portion of the first end segment 84 as shown in FIG. 7.

Figure 8:
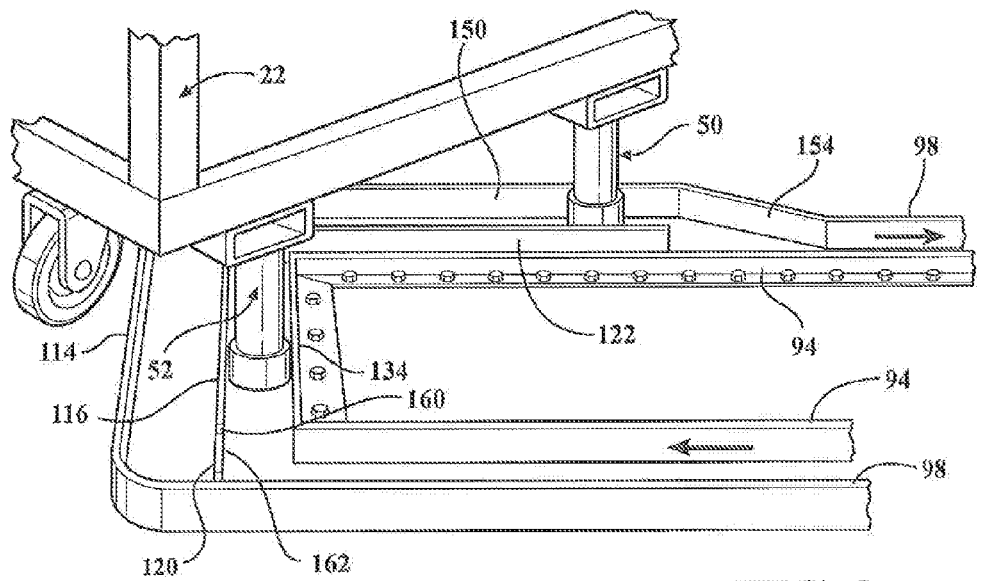

However, since the elevation or height of the bottom surface 67 of the second cam follower 66 is less than the height or elevation of the top edge 162 of the notch 160 in the intermediate wall 116, the second cam follower 66 will strike the lower end portion of the intermediate wall 116 adjacent the first end 120 of the intermediate wall 116 and be urged sideways through a 90° turn along the inner channel 132 as shown in FIG. 8.

Figure 9:
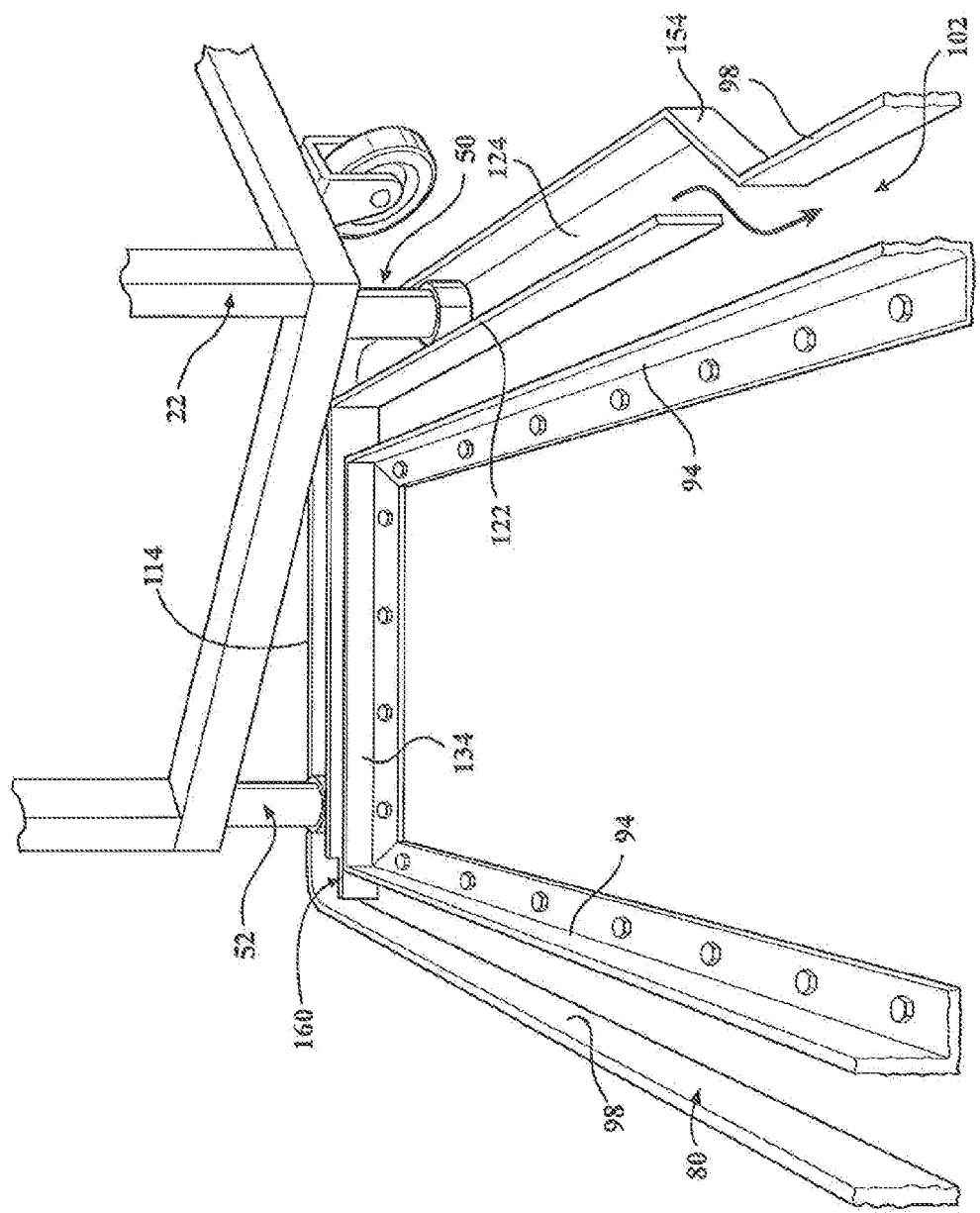

As the rear or second cam follower 66 begins to traverse along the linear portion of the inner end channel 132, the first or front cam follower 64, as also shown in FIG. 8, will traverse along the length of the second turn segment 114 of the first end segment 84 of the track 20 toward the ramp or realignment wall 154. This is also shown in FIG. 9.

Figure 10:
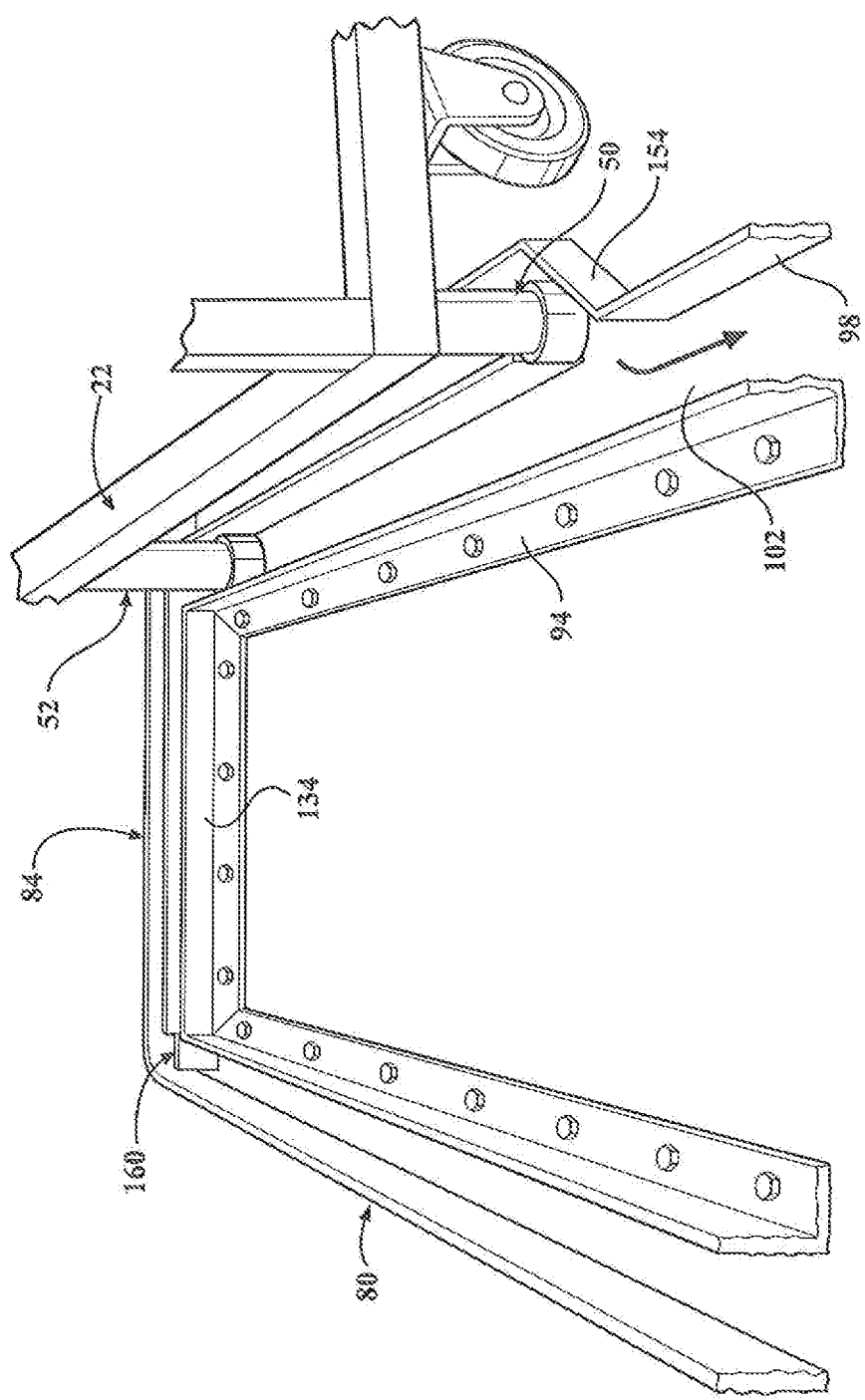
Figure 11:
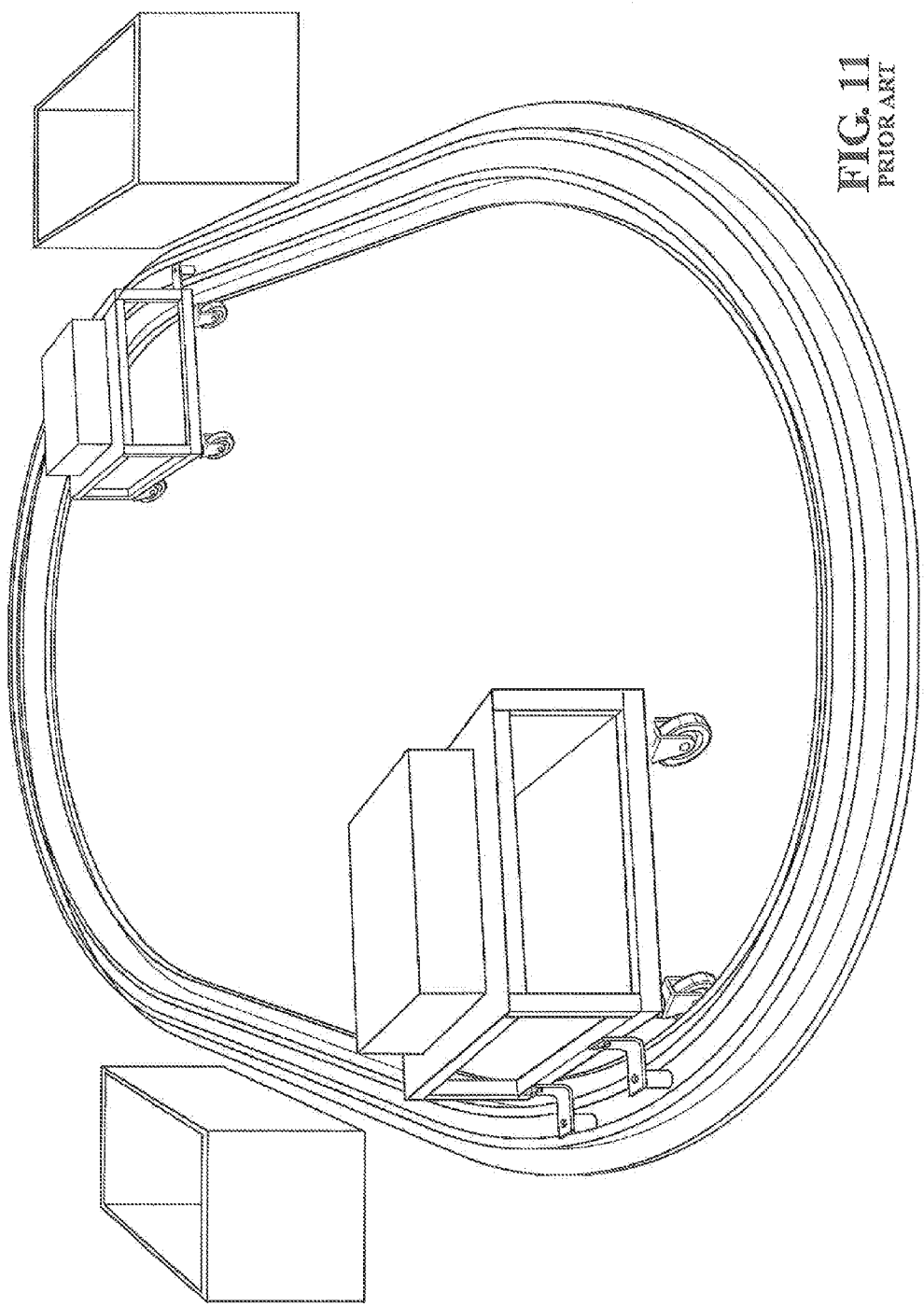
FIG. 11 is a perspective view of a prior art cart movement control track.
Figure 12:
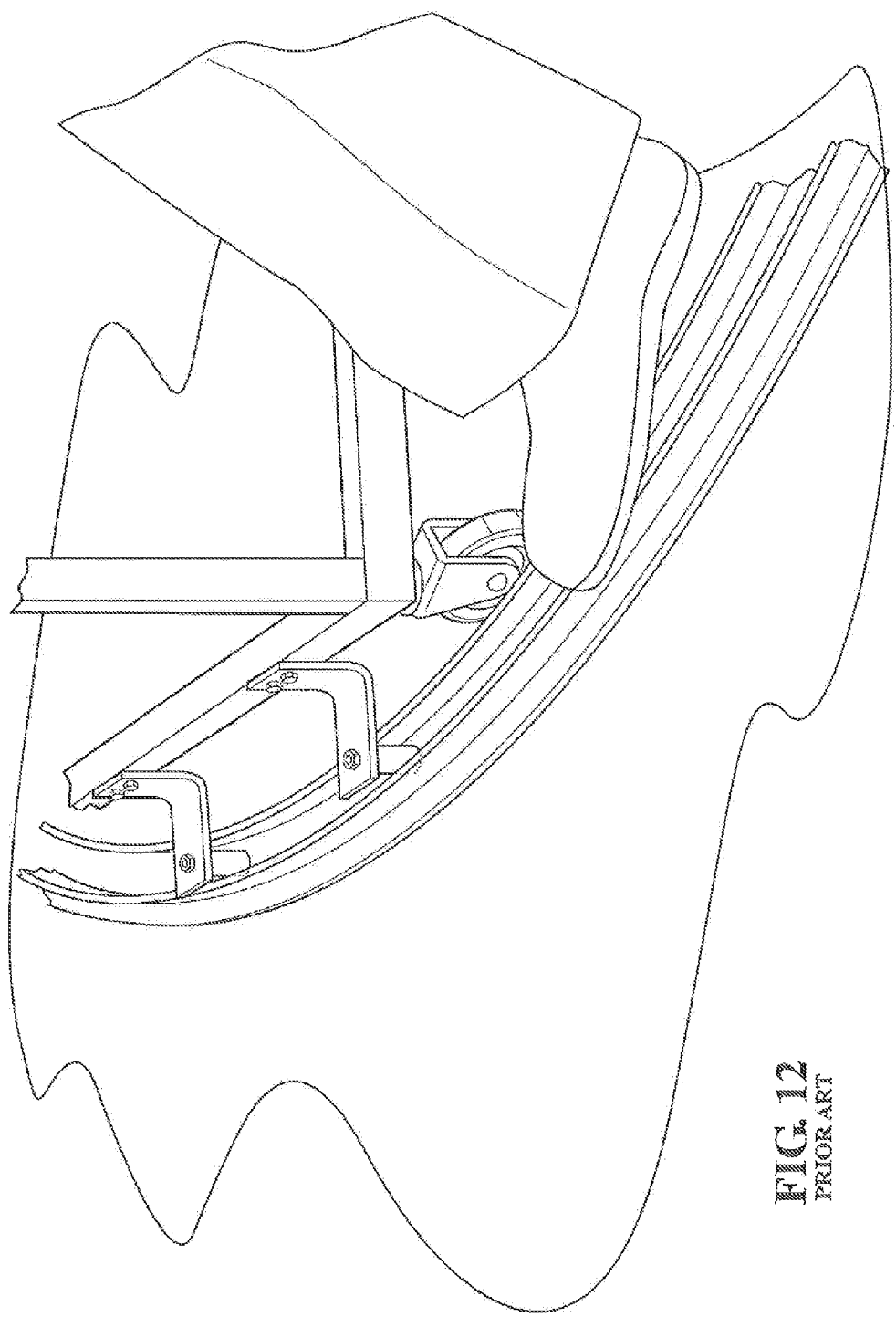
FIG. 12 is a partial perspective view of a prior art cart movement control layout.

As shown in FIG. 10, when the first or front located cam follower 64 strikes the ramp or realignment wall 154, the pushing movement of the operator on the cart 22 causes the ramp or realignment wall 154 to urge the first or front cam follower 64 and thereby the forward positioned edge of the cart 20 pass the end 124 of the intermediate wall 112 and move back into the second channel 102 of the second side track 82.

As shown in FIG. 10, as this realignment angular movement of the first cam follower 64 begins, the second or rear cam follower 66 is positioned adjacent the inner corner 126 in the inner end track 132.

When first cam follower 64 is repositioned in line with the second channel 102, the first and second cam follower 66 are again in alignment with the longitudinal axis of the second side track 82 for movement along the length of the second side track 82 toward the second end segment 86.

The same turn and quarrying sequence takes place as the operator 22 pushes the cart through the second end segment 86 back to the position shown in FIG. 1 wherein the first and second cam followers 64 and 66 are in coaxial alignment with the longitudinal axis of the first track side segment 80.

What is claimed is:

1. A cart directional flow control apparatus comprising:
a track;
a movable cart with first and second cam followers along one edge slidable along the track with the first cam follower forward of the second cam follower in a direction of travel of the cart along the track;
an elevation of a bottom surface of the first cam follower being higher than the elevation of a bottom surface of a second cam follower; and
the track defined by:
first and second substantially parallel side leg track segments respectively defining first and second channels movably receiving first and second cam followers, respectively;
a first end segment continuously joining one end of the first and second side leg segments; and
first and second inner and outer end tracks formed by the first end segment separately respectively receiving the first and second cam followers to guide the cart around the first end segment between the first and second side leg track segments.

2. The apparatus of claim 1 further comprising:
a realignment track segment coupling one end of the first end segment and one end of the second side leg track segment to direct the first and second cam followers of the cart in the respective first and second inner and outer end tracks in the first end segment into the second side leg track segment.

3. The apparatus of claim 1 further comprising:
an intermediate wall separating the first end segment into the first and second inner and outer end tracks; and
the elevation of the bottom surface of the first and second cam followers cooperating with a height of the intermediate wall in first end segment to direct the first cam follower into the second outer end track and to direct the second cam follower into the first inner end track of the first end segment.

4. The apparatus of claim 3 further comprising:
the first end of the intermediate wall cooperating with the first and second cam followers to direct the first cam follower to the second outer end track and to direct the second cam follower into the first inner end track.

5. The apparatus of claim 4 further comprising:
an opening formed between a second end of the intermediate wall and the second side leg track segment; and
the opening opposed to a ramp wall connecting the second outer end track to the second side leg track segment and directing the first cam follower from the second outer end track into the second side leg track segment.

6. The apparatus of claim 4 further comprising:
a notch formed at one end of the intermediate wall; and
the notch having a height less than a height of a bottom surface of the first cam follower allowing the first cam follower to pass over the notch into the second outer end track.

7. The apparatus of claim 3 comprising:
the first inner end track in the first end segment forming a continuation of the first and second side leg track segments for movement of the second cam follower on the cart from the first side leg track segment, through the first end segment and into the second side leg track segment.

8. The apparatus of claim 7 wherein:
the intermediate wall has a first height over a substantial entire length; and
a notch is formed at the first end of the intermediate wall defining the height of the first end of the intermediate wall as less than the first height of the substantial entire length of the intermediate wall.

9. The apparatus of claim 3 wherein:
the bottom surface of the first cam follower is at a first elevation;
a bottom surface of the second cam follower is at a second elevation; and the first elevation is less than the second elevation.

10. The apparatus of claim 9 wherein:
a height of the first end of the intermediate wall is less than the first elevation and greater than the second elevation.

11. The apparatus of claim 1 wherein the first end segment further comprises:
a first turn segment contiguous with the first side leg track segment; and
a second turn segment contiguous with the second side leg track segment.

12. The apparatus of claim 11 further comprising:
the first end segment including an intermediate wall forming the first and second inner and outer end tracks in the first end segment;
each of the first and second inner and outer end tracks in the first end segment disposed in communication with the first side leg track segment and the second side leg track segment.

13. The apparatus of claim 1 further comprising:
another end segment continuously joining other ends of first and second side leg track segments to form the track into a continuous loop.

14. The apparatus of claim 1 wherein:
the first and second inner and outer end tracks are disclosed substantially 90° relative to longitudinal axes of the first and second side leg track segments.

15. The apparatus of claim 1 wherein:
the first and second inner and outer end tracks and an intermediate wall separating the first and second inner and outer end tracks are disposed at a substantially 90° angle to an end of the first side track segment.

16. A cart directional flow control apparatus comprising:
a track;
a removable cart with first and second cam followers along one edge slidable along the track with the first cam follower forward of the second cam follower in a direction of travel of the cart on the track;

an elevation of a bottom surface of the first cam follower being higher than an elevation of a bottom surface of a second cam follower;

the track defined by:
  first and second substantially parallel leg segments with respective first and second channels movably receiving the first and second cam followers, respectively,
  an end segment continuously joining one end of the first and second leg segments;
  an intermediate wall in the end segment defining substantially parallel inner and outer end segment channels in the end segment;
  a first end of the intermediate wall disposed in intersecting communication with the first channel;
  the first end of the intermediate wall cooperating with the first and second cam followers to direct the first and second cam followers through the inner and outer end segment channels at an angle to the axial extent of the intermediate wall;
  the end segment including a turn portion communicating with one end of the second track leg segment and coaxially disposing the inner end segment channel with the second track leg segment; and
  a ramp wall opposed to a second end portion of the intermediate wall and forming a continuous extension of an outer wall of the end segment and the second track leg seqment to direct the first cam follower from the outer end segment channel into the second track leg segment ahead of the second cam follower.

17. In a part accumulation storage cart movable along a track in a floor between a plurality of part storage locations located laterally outside of the track to allow accumulation of selected parts from the plurality of parts storage locations into the cart, the improvement comprising:

a track mounted in a floor and having first and second substantially parallel side leg segments and at least one first end segment connecting ends of the first and second side leg segments;
  a cart;
  first and second cam followers mounted on the cart and movably engaging the track to control movement of the cart on the floor along the track between a plurality of parts storage locations; and
  the first and second cam followers cooperating with the track to maintain the cart on the floor between the track and the part storage locations as the first and second cam followers move along the track.

18. A parts accumulation storage cart movement control apparatus comprising:

a continuous loop track mounted on the floor and formed of first and second side leg track segments and opposed first and second end track segments respectively interconnected with opposed ends of the first and second side leg track segments;
  the continuous loop track surrounding an interior floor portion disposed between the first and second side leg track segments and the first and second end track segments, an exterior floor portion disposed laterally outside of the continuous loop track;
  at least one cart coupled to the track for movement across the floor along the continuous loop track; and
  at least one parts storage container laterally spaced on the exterior floor portion from the continuous loop track; and
  the cart, while coupled to the continuous loop track, movable across the exterior floor portion between the continuous loop track and the at least one parts storage container.

* * * * *